(12) United States Patent
Moschet et al.

(10) Patent No.: US 9,413,047 B2
(45) Date of Patent: Aug. 9, 2016

(54) ASSEMBLY TO MANAGE CONTACT BETWEEN BATTERY CELL ARRAY AND THERMAL INTERFACE COMPONENT OF THERMAL PLATE

(71) Applicant: Ford Global Technologies, LLC, Dearborn, MI (US)

(72) Inventors: David Moschet, Dearborn, MI (US); Rajaram Subramanian, Ann Arbor, MI (US); Sai K. Perumalla, Rochester Hills, MI (US); Saravanan Paramasivam, South Lyon, MI (US); Brian Utley, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 14/503,446

(22) Filed: Oct. 1, 2014

(65) Prior Publication Data

US 2016/0099449 A1   Apr. 7, 2016

(51) Int. Cl.
  *H01M 2/10*   (2006.01)
  *H01M 10/6554*  (2014.01)
  *H01M 10/625*  (2014.01)

(52) U.S. Cl.
  CPC ........ *H01M 10/6554* (2015.04); *H01M 2/1077* (2013.01); *H01M 10/625* (2015.04); *H01M 2220/20* (2013.01)

(58) Field of Classification Search
  CPC . H01M 2/024; H01M 2/1083; H01M 2/1077; H01M 10/613; H01M 10/615; H01M 10/625; H01M 10/6554
  See application file for complete search history.

(56) References Cited

U.S. PATENT DOCUMENTS

| | | | |
|---|---|---|---|
| 4,615,107 A * | 10/1986 | Kumeta | H01M 8/247 29/623.1 |
| 7,147,071 B2 | 12/2006 | Gering et al. | |
| 8,758,924 B2 | 6/2014 | Tennessen et al. | |
| 2008/0311468 A1 | 12/2008 | Hermann et al. | |
| 2009/0023056 A1 | 1/2009 | Adams et al. | |
| 2011/0117419 A1* | 5/2011 | Lee | H01M 2/1077 429/156 |
| 2012/0009455 A1* | 1/2012 | Yoon | H01M 10/6552 429/120 |
| 2012/0225341 A1 | 9/2012 | Major et al. | |
| 2013/0136970 A1* | 5/2013 | Kurokawa | H01M 2/1077 429/99 |
| 2014/0329121 A1* | 11/2014 | Nishihara | H01M 2/1077 429/90 |

* cited by examiner

*Primary Examiner* — Muhammad Siddiquee
(74) *Attorney, Agent, or Firm* — David B. Kelley; Brooks Kushman P.C.

(57) ABSTRACT

A vehicle traction battery assembly is provided which may include a support structure, a thermal interface component, and a pressure plate. The support structure may include a center bar arrangement and may be configured to support a thermal plate and battery cell array. The thermal interface component may be disposed between the array and plate. The pressure plate may be on an upper face of the array. The assembly may be configured to exert a force against the pressure plate to compress the thermal interface component between the thermal plate and array. The center bar arrangement may include a center bar extending along the array and may be shaped to define a passageway between the upper face and the center bar. The pressure plate may be at least partially disposed within the passageway.

16 Claims, 7 Drawing Sheets

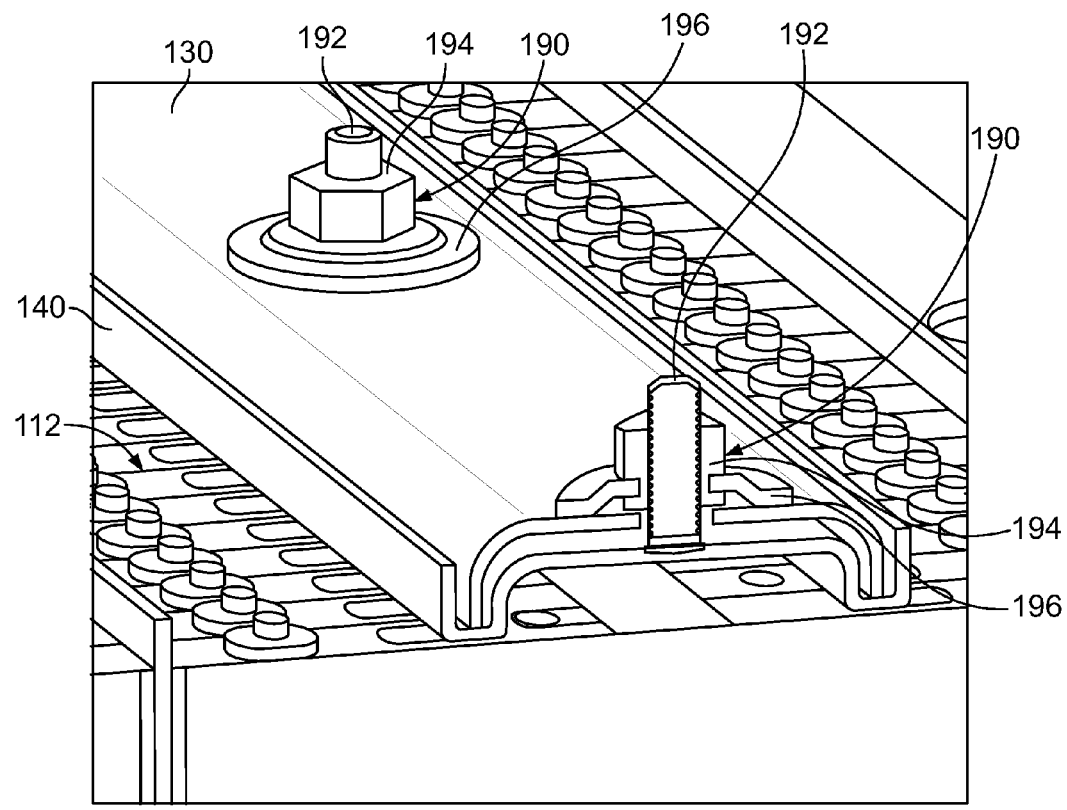
FIG. 7A
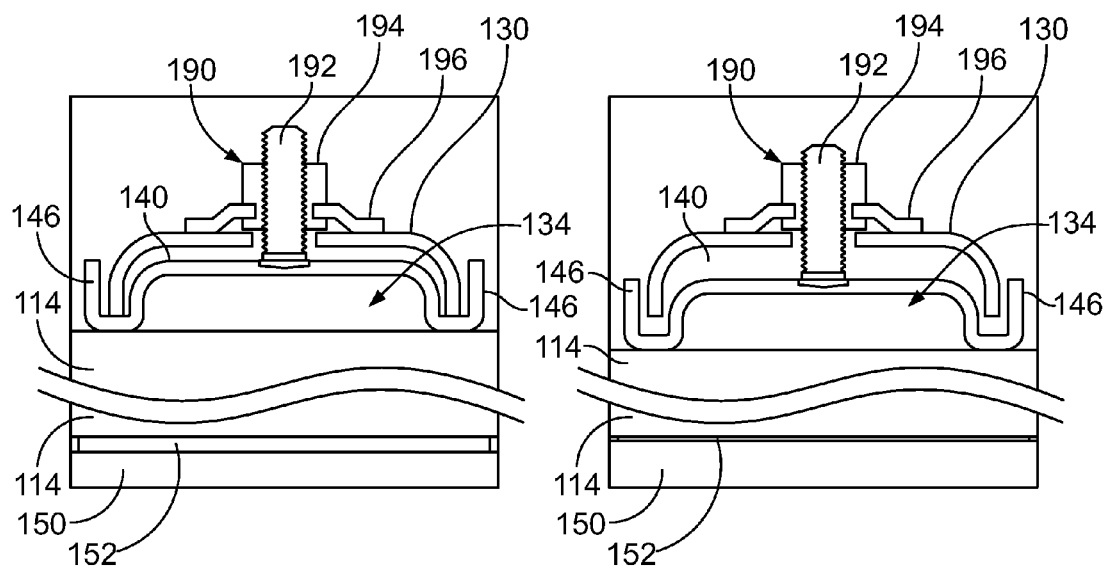
FIG. 7B  FIG. 7C

ASSEMBLY TO MANAGE CONTACT BETWEEN BATTERY CELL ARRAY AND THERMAL INTERFACE COMPONENT OF THERMAL PLATE

TECHNICAL FIELD

This disclosure relates to thermal management systems for high voltage batteries utilized in vehicles.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells. Vehicles with one or more HV batteries may include a battery management system that measures and/or estimates values descriptive of the HV battery, vehicle components, and/or battery cell present operating conditions.

SUMMARY

A vehicle traction battery assembly includes a support structure, a thermal interface component, and a pressure plate. The support structure includes a center bar arrangement and is configured to support a thermal plate and battery cell array. The thermal interface component is disposed between the array and plate. The pressure plate is on an upper face of the array. The assembly is configured to exert a force against the pressure plate to compress the thermal interface component between the thermal plate and array. The center bar arrangement may include a center bar extending along the array and may be shaped to define a passageway between the upper face and the center bar. The pressure plate may be at least partially disposed within the passageway. The support structure may include a pair of endplates and a pair of sidewalls. The center bar may span between the endplates such that opposite ends of the center bar are secured to the endplates. The pressure plate may define two flanges extending outside of the passageway. The flanges may be shaped to define a trough to receive portions of the center bar to orient the pressure plate along a central longitudinal axis of the array. The center bar arrangement may also include a receiving nut and a bolt. The receiving nut may be secured to the center bar within the passageway. The bolt may extend through the center bar and receiving nut, and may be configured to contact and move the pressure plate when a torque is applied to the bolt. The battery cell array may define a central longitudinal axis along the upper face. The receiving nut and bolt may be located proximate the central longitudinal axis. The center bar arrangement may include a stud and a fastener. The stud may extend from the pressure plate and through the center bar. The fastener may be located outside of the passageway, threaded with the stud, and configured to drive movement of the pressure plate such that the pressure plate exerts a force against the upper face. The battery cell array may define a central longitudinal axis along the upper face. The stud and fastener may be located proximate the central longitudinal axis. The pressure plate may be configured for vertical movement relative to the center bar.

A vehicle includes a support structure, a center bar assembly, a pressure plate, a thermal plate, and a thermal interface component. The support structure includes a pair of endplates and sidewalls configured to retain a battery cell array defining an upper face. The center bar assembly is secured to the endplates and includes a center bar extending along a length of the upper face and defining a passageway therebetween. The pressure plate is partially disposed within the passageway and extends along the length of the array. The thermal plate is supported by the structure and located below the array. The thermal interface component is disposed between the plate and array. The center bar assembly is configured to exert a force against the pressure plate such that the thermal interface component is compressed between the array and plate. The pressure plate may define a pair of flanges each extending outside the passageway. The flanges may each define a trough to receive a lower portion of the center bar. The center bar assembly may further include a receiving nut and a bolt. The receiving nut may be secured to the center bar within the passageway. The bolt may extend through the center bar and receiving nut and may be configured to contact and move the pressure plate when a torque is applied to the bolt. The battery cell array may define a central longitudinal axis along the upper face. The receiving nut and the bolt may be located proximate the central longitudinal axis. The center bar assembly may include a stud extending from the pressure plate and through the center bar. The center bar assembly may include a fastener threaded with the stud and configured to drive movement of the pressure plate such that the pressure plate exerts a force against the upper face. The battery cell array may define a central longitudinal axis along the upper face. The stud and fastener may be located proximate the central longitudinal axis. The pressure plate may be configured for vertical movement relative to the center bar.

A vehicle traction battery system includes a support structure, a center bar arrangement, and a thermal interface component. The support structure includes a battery tray, is configured to retain a battery cell array, and defines a cavity between the tray and array. The center bar arrangement is at least partially disposed within the cavity and includes a center bar supporting a thermal plate. The thermal interface component is disposed between the array and plate. The arrangement is configured to exert a force against the plate to compress the thermal interface component between the plate and array. The center bar may be configured for vertical movement relative to the battery tray. The thermal plate may define a lower face. The center bar arrangement may further include a receiving nut secured to the center bar, and a bolt extending through the center bar and receiving nut which may be configured to contact the battery tray and move the thermal plate when a torque is applied to the bolt. The center bar arrangement may further include a stud extending from the battery tray and through the center bar, and a fastener threaded with the stud and configured to drive movement of the center bar such that the thermal interface component is compressed between the thermal plate and battery cell array.

BRIEF DESCRIPTION OF THE DRAWINGS

FIG. 7A is a fragmentary perspective view, in cross-section, of the portion of the traction battery of FIG. 3 showing another example of a center bar assembly.

FIG. 7B is a front view, in cross-section, of the center bar assembly of FIG. 7A shown in a first position.

FIG. 7C is a front view, in cross-section, of the center bar assembly of FIG. 7A shown in a second position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
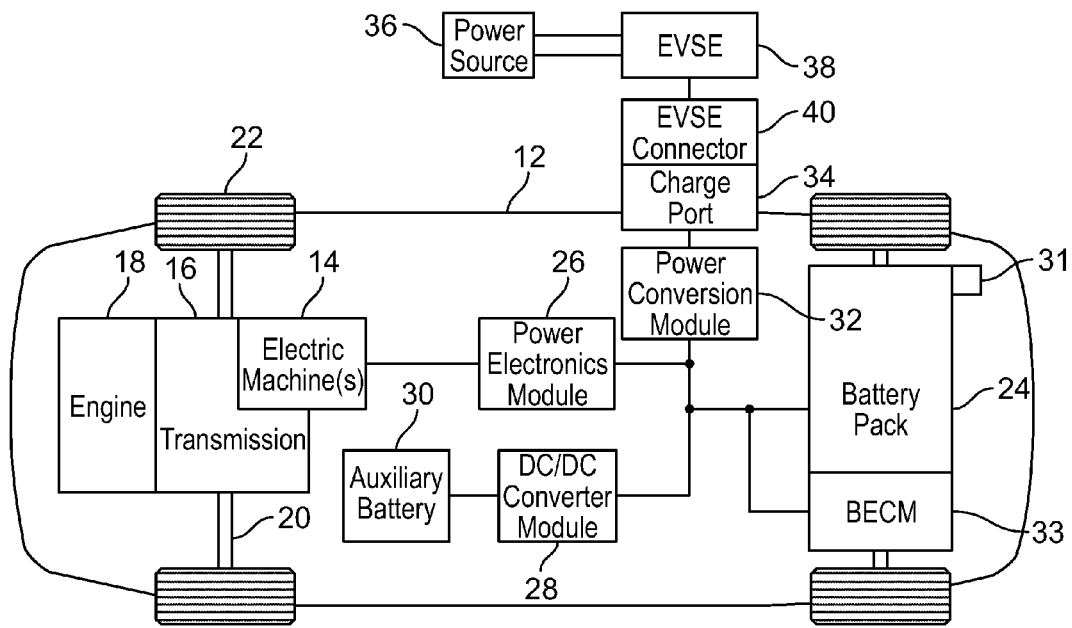
FIG. 1 is a schematic illustrating a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

The traction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another and structural components. The DC/DC converter module 28 and/or the BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

In one example, the battery cell array 88 may be mounted to the thermal plate 90 such that only one surface, of each of the battery cells 92, such as a bottom surface, is in contact with the thermal plate 90. The thermal plate 90 and individual battery cells 92 may transfer heat between one another to assist in managing the thermal conditioning of the battery cells 92 within the battery cell array 88 during vehicle operations. Uniform thermal fluid distribution and high heat transfer capability are two thermal plate 90 considerations for providing effective thermal management of the battery cells 92 within the battery cell arrays 88 and other surrounding components. Since heat transfers between thermal plate 90 and thermal fluid via conduction and convection, the surface area in a thermal fluid flow field is important for effective heat transfer, both for removing heat and for heating the battery cells 92 at cold temperatures. For example, charging and discharging the battery cells generates heat which may negatively impact performance and life of the battery cell array 88 if not removed. Alternatively, the thermal plate 90 may also provide heat to the battery cell array 88 when subjected to cold temperatures.

Figure 2:
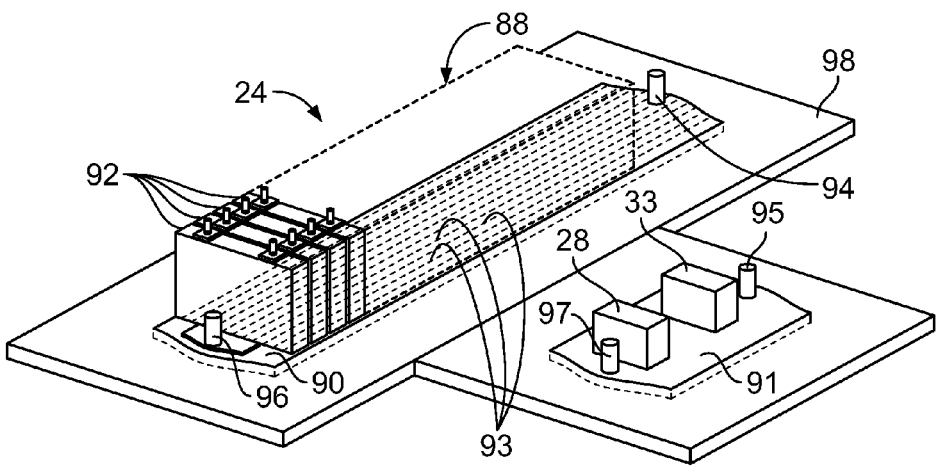
FIG. 2 is a perspective view of a portion of a traction battery and thermal management system.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a sheet of thermal interface material (not shown) may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90 by filling, for example, voids and/or air gaps between the battery cells 92 and the thermal plate 90. The thermal interface material may also provide electrical insulation between the battery cell array 88 and the thermal plate 90. A battery tray 98 may support the thermal plate 90, the thermal plate 91, the battery cell array 88, and other components. The battery tray 98 may include one or more recesses to receive thermal plates.

Different battery pack configurations may be available to address individual vehicle variables including packaging constraints and power requirements. The battery cell array 88 may be contained within a cover or housing (not shown) to protect and enclose the battery cell array 88 and other surrounding components, such as the DC/DC converter module 28 and the BECM 33. The battery cell array 88 may be positioned at several different locations including below a front seat, below a rear seat, or behind the rear seat of the vehicle, for example. However, it is contemplated the battery cell arrays 88 may be positioned at any suitable location in the vehicle 12.

A contact of the mating surfaces between a thermal plate and surfaces of the battery cells is a factor which may affect heat transfer within a battery thermal management system and particularly with regard to conduction between the thermal plate and the battery cells. The mating surfaces may be uneven due to surface tolerances, component irregularities, and/or debris which may result in gaps therebetween. Additionally, deformation of the battery cell array, such as bending and/or twisting, may result in battery cell to battery cell placement tolerances. Heat transfer relating to battery cell cooling may be less efficient where gaps are present between the mating surfaces of the respective thermal plates and bottom surfaces of the battery cells. Some thermal management systems may use a thermal interface layer to assist in filling gaps, however a thermal interface layer may not be able to compensate for certain contact deficiencies. Eliminating these contact deficiencies and/or obtaining a flush contact between the surfaces may be desirable to provide for more enhanced heat transfer within the thermal management system.

Figure 3:
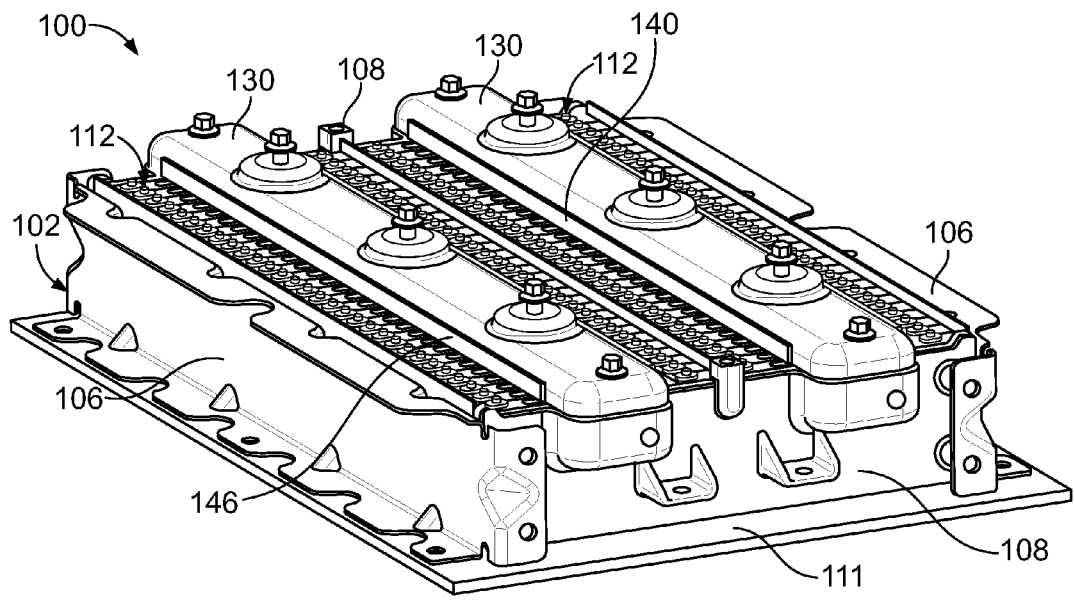
FIG. 3 is a perspective view of a portion of another traction battery.
Figure 4:
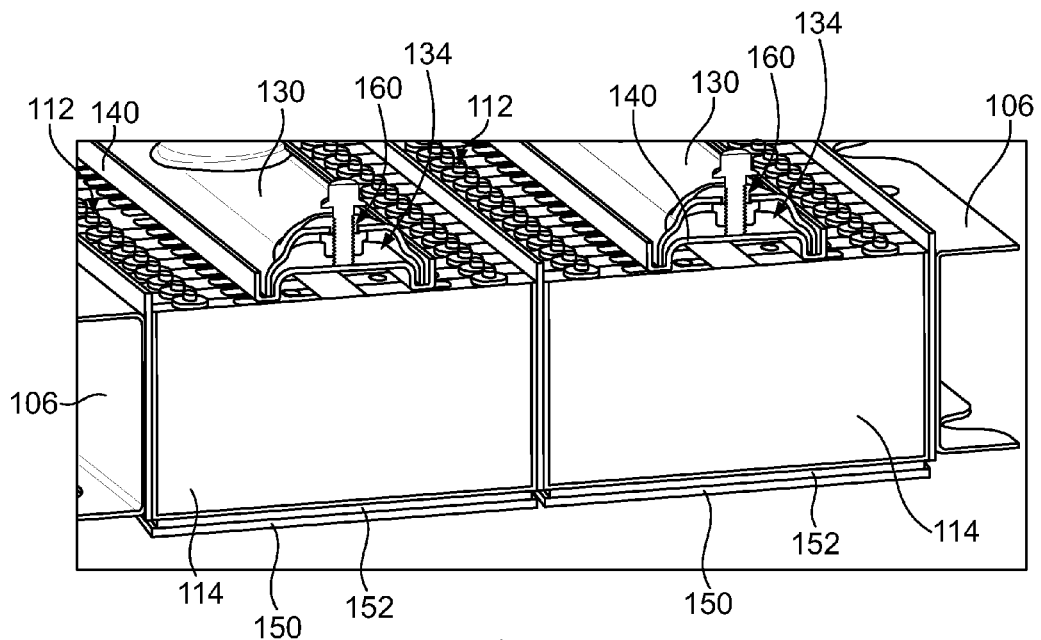
FIG. 4 is a fragmentary perspective view, in cross-section, of the portion of the traction battery of FIG. 3 showing an example of a center bar assembly.
Figure 5:
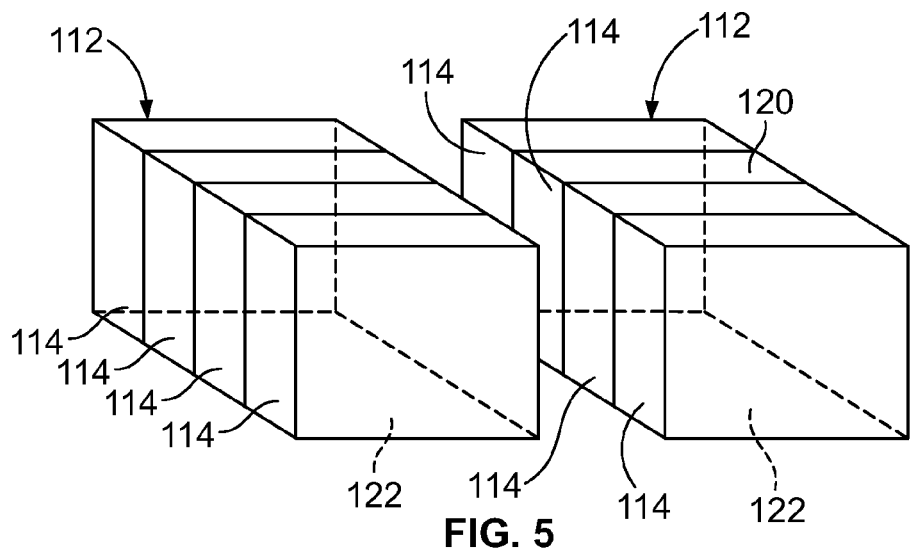
FIG. 5 is a perspective view of two battery cell arrays of the portion of traction battery of FIG. 3.

FIGS. 3 and 4 show an example of a traction battery generally referred to as a traction battery 100. The traction battery 100 may include may include a support structure 102. The support structure 102 may include a pair of sidewalls 106 and a pair of endplates 108 secured to one another. The support structure 102 may be supported by a battery tray 111. A pair of battery cell arrays 112 may be supported and retained within the support structure 102. It is contemplated that other examples of traction batteries may include alternative numbers of battery cell arrays such as the single battery cell array 88 shown in FIG. 2. The battery cell arrays 112 may include a plurality of battery cells 114. The plurality of battery cells 114 may define an upper face 120 and a lower face 122 of each of the battery cell arrays 112.

A pair of center bars 130 may be secured to the endplates 108 such that the center bars 130 extend along the upper faces 120 of the respective battery cell arrays 112. In this example, the pair of center bars 130 is located above the upper faces 120 of the respective battery cell arrays 112. The center bars 130 and the respective battery cell arrays 112 may define a pair of passageways 134 therebetween. A pressure plate 140 may be at least partially disposed within each of the passageways 134. The pressure plates 140 may extend along the upper faces 120 of the respective battery cell arrays 112. The pressure plates 140 may include flanges 146 which extend outside of the passageways 134. The flanges 146 may assist in locating the pressure plates 140 relative to the center bars 130 and battery cell arrays 112 during assembly and/or installation. The flanges 146 may also define a trough to receive a lower portion of the center bars 130. For example, the flanges 146 may assist in orienting the pressure plates 140 such that a portion of the pressure plates 140 contacts each of the battery cells 114 in each of the battery cell arrays 112 at a central or substantially central longitudinal portion of the battery cell arrays 112.

A thermal plate 150 may be supported by the support structure 102 and/or the battery tray 111. A thermal interface component 152 may be disposed between the thermal plate 150 and each of the battery cell arrays 112. The thermal plate 150 may be two components located beneath each of the battery cell arrays 112 or may be a single component. The thermal interface component 152 may enhance heat transfer between the battery cell arrays 112 and the thermal plate 150 by filling, for example, voids and/or air gaps between the battery cells 114 and the thermal plate 150. The thermal interface component 152 may also provide electrical insulation between the battery cell arrays 112 and the thermal plate 150. The thermal interface component 152 may be two components or may be a single component. Examples of thermal interface components 152 may include a sheet of thermal interface material or a thermal interface paste.

Figure 6A:
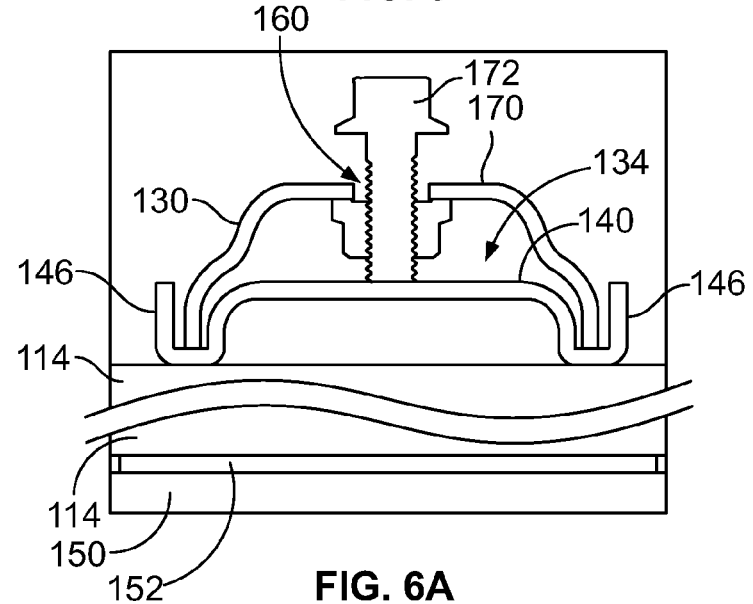
FIG. 6A is a front view, in cross-section, of the center bar assembly of FIG. 4 shown in a first position.
Figure 6B:
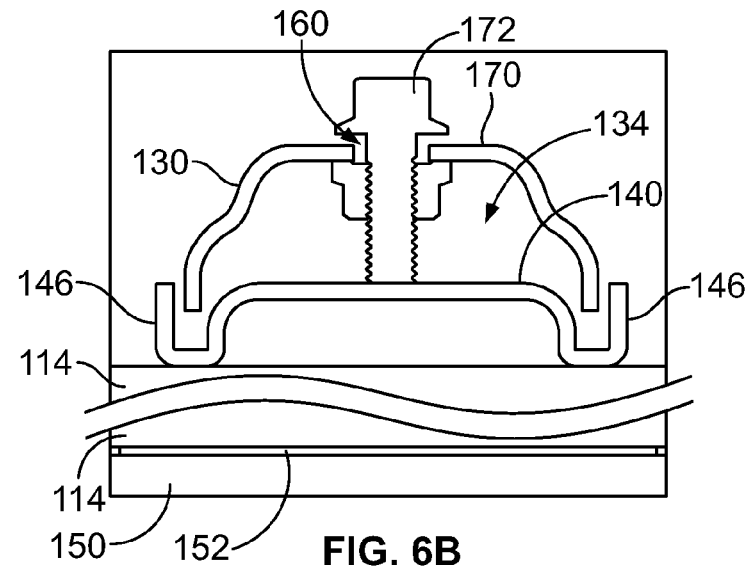
FIG. 6B is a front view, in cross-section, of the center bar assembly of FIG. 4 shown in a second position.

One or more center bar assemblies may be utilized to assist in promoting desired contact between the battery cell arrays 112, the thermal plate 150, and the thermal interface component 152. For example, a first center bar assembly 160 may include an arrangement of the center bar 130, a receiving nut 170 and a bolt 172. The receiving nut 170 may be threaded and secured to an inner portion of the center bar 130. The receiving nut 170 may be configured to receive the bolt 172 such that the bolt 172 may mesh with the receiving nut 170. FIGS. 6A and 6B show an example, in cross-section, of the first center bar assembly 160 in a first position and a second position. The thermal interface component 152 is shown compressed between the battery cells 114 and the thermal plate 150 in FIG. 6B. A lower portion of the bolt 172 may contact the pressure plate 140 under certain conditions. The battery cell arrays 112 may each define a central longitudinal axis extending along the upper faces 120 of the battery cell arrays 112 and the receiving nut 170 and the bolt 172 may be located proximate thereto. The bolt 172 may exert a force against the pressure plate 140 when, for example, a torque is applied to the bolt 172. The force exerted against the pressure plate 140 may drive the pressure plate 140 downward to contact the respective battery cell array 112 and push the battery cell array 112 downward. The downward movement of the battery cell array 112 may compress the thermal interface component 152, when present, between the thermal plate 150 and the battery cell arrays 112 to assist in providing uniform or substantially uniform contact between the thermal interface component 152 and the battery cell array 112. Various torque applications may be applied to the bolt 172 to provide a desired amount of movement of the pressure plate 140 according to a particular traction battery packaging requirement. It is contemplated that one or more of the center bar assemblies disclosed herein may assist in compressing the battery cell array 112 and the thermal plate 150 together in an example of a traction battery in which the thermal interface component 152 is not present.

FIGS. 7A through 7C show another example of a center bar assembly which may be utilized to assist in promoting desired contact between the battery cell arrays 112 and the thermal interface component 152 within the support structure 102. For example, a second center bar assembly 190 may include an arrangement of the center bar 130, a stud 192, a wrenchable weld nut 194, and a cap 196. The stud 192 may be secured to the pressure plate 140 and extend through the center bar 130. The wrenchable weld nut 194 may be threaded and rotatably secured to the cap 196. The wrenchable nut 194 may be configured to receive the stud 192 such that the stud 192 may mesh with the wrenchable weld nut 194. The cap 196 may be secured to the center bar 130. FIGS. 7B and 7C show an example, in cross-section, of the second center bar assembly 190 in a first and a second position. The thermal interface component 152 is shown compressed between the battery cells 114 and the thermal plate 150 in FIG. 7C. The wrenchable weld nut 194 may be loosened to drive the stud 192 and pressure plate 140 downward such that a force is exerted against the respective battery cell array 112 by the pressure plate 140. The downward movement of the battery cell array 112 may compress the thermal interface component 152 between the thermal plate 150 and the battery cell arrays 112 to assist in providing uniform or substantially uniform contact between the thermal interface component 152 and the battery cell array 112. The wrenchable weld nut 194 may be loosened or tightened to provide a desired amount of movement of the pressure plate 140 according to a particular traction battery packaging requirement.

Figure 8:
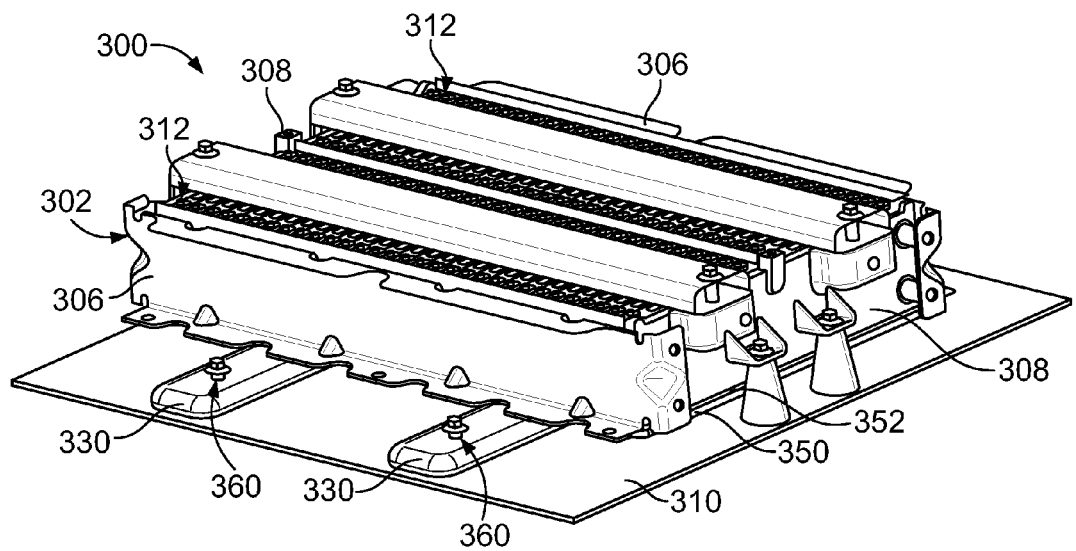
FIG. 8 is a perspective view of a portion of yet another traction battery.
Figure 9:
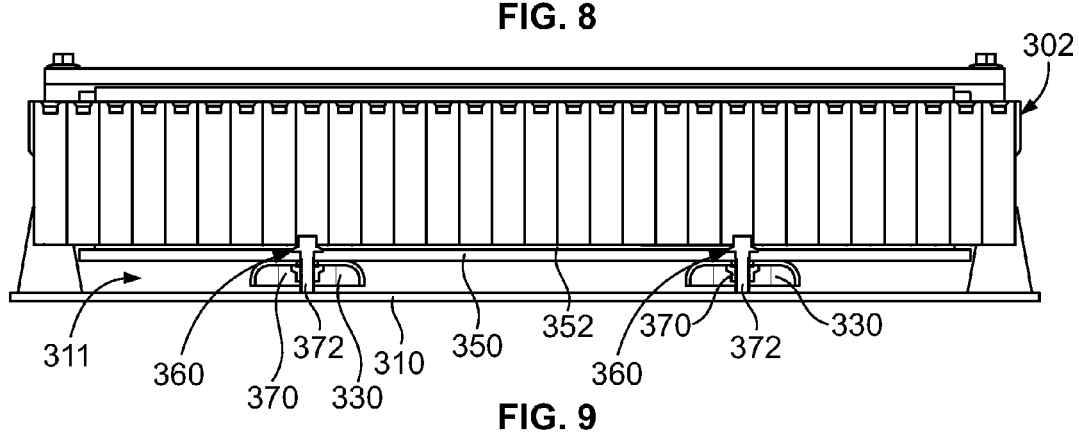
FIG. 9 is a side view of the traction battery of FIG. 8 showing an example of another center bar assembly with a sidewall of a support structure removed to show internal components.
Figure 10:
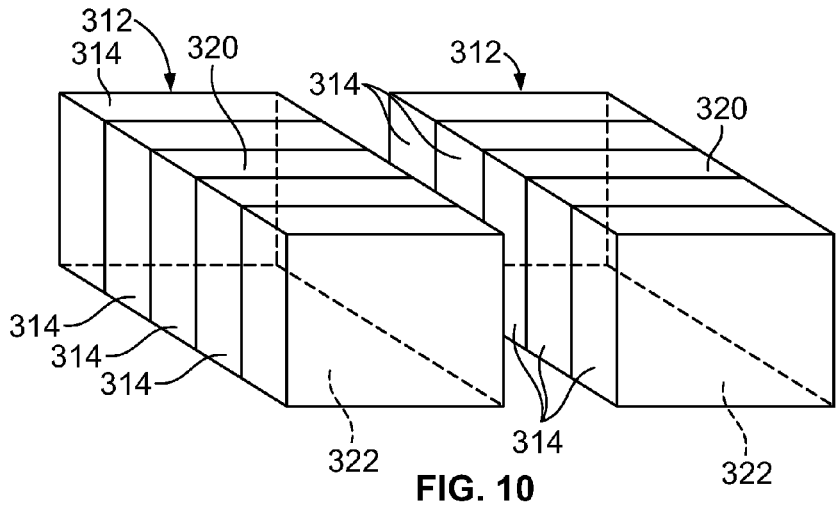
FIG. 10 is a perspective view of two battery cell arrays of the traction battery of FIG. 8.

FIGS. 8 and 9 show another example of a traction battery generally referred to as a traction battery 300. The traction battery 300 may include a support structure 302. The support structure 302 may include a pair of sidewalls 306 and a pair of endplates 308 secured to one another. The support structure 302 may be supported by a battery tray 310 such that a cavity 311 is defined therebetween. A pair of battery cell arrays 312 may be supported and retained within the support structure 302. It is contemplated that other examples of traction batteries may include alternative numbers of battery cell arrays such as the single battery cell array 88 shown in FIG. 2. The battery cell arrays 312 may include a plurality of battery cells 314. The plurality of battery cells 314 may define an upper face 320 and a lower face 322 of each of the battery cell arrays 312 as shown in FIG. 10.

A pair of lower center bars 330 may be at least partially disposed within the cavity 311. In this example, the pair of lower center bars 330 may extend laterally beneath the support structure 302. The pair of lower center bars 330 may be configured for vertical movement as further described herein. The pair of lower center bars 330 may extend along a thermal plate 350. For example, the thermal plate 350 may be supported by the pair of lower center bars 330 and located beneath the battery cell arrays 312. The thermal plate 350 may define a lower surface and be secured to the pair of lower center bars 330 such that the thermal plate 350 and the pair of lower center bars 330 may move together under certain conditions further described herein. The thermal plate 350 may be two components located beneath the battery cell arrays 312 or may be a single component. A thermal interface component 352 may be disposed between the thermal plate 350 and each of the battery cell arrays 312. The thermal interface component 352 may enhance heat transfer between the battery cell arrays 312 and the thermal plate 350 by filling, for example, voids and/or air gaps between the battery cells 314 and the thermal plate 350. The thermal interface component 352 may also provide electrical insulation between the battery cell arrays 312 and the thermal plate 350. The thermal interface component 352 may be two components or may be a single component. Examples of thermal interface components 352 may include a sheet of thermal interface material or a thermal interface paste.

Figure 11A:
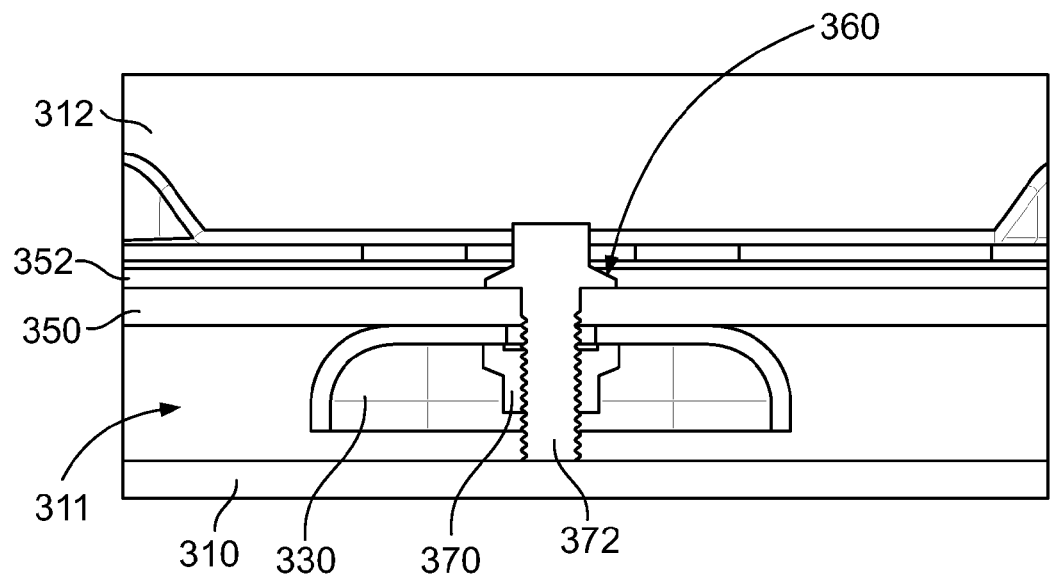
FIG. 11A is a front view, in cross-section, of the center bar assembly of FIG. 9 shown in a first position.
Figure 11B:
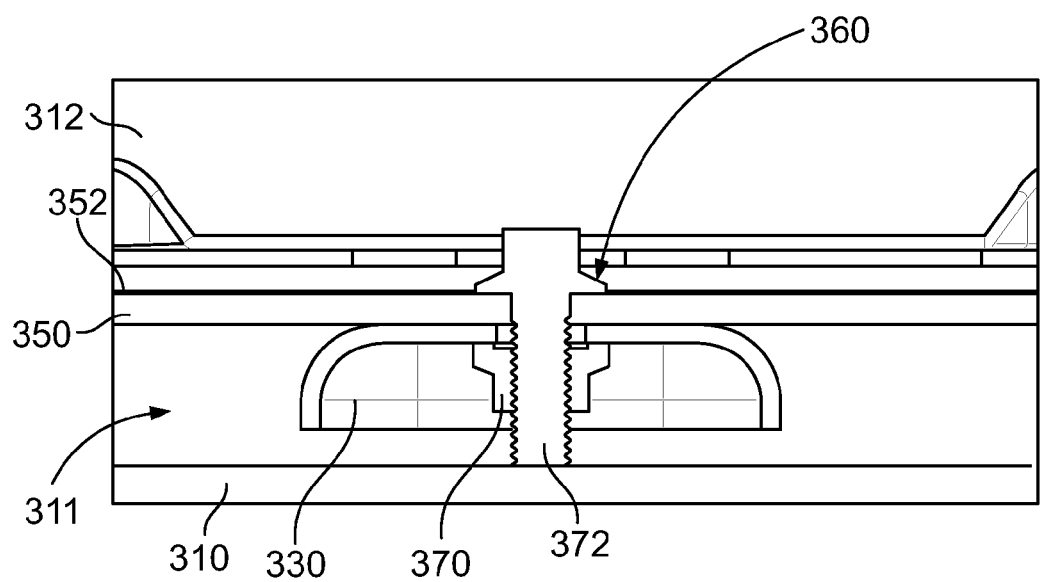
FIG. 11B is a front view, in cross-section, of the center bar assembly of FIG. 9 shown in a second position.

One or more center bar assemblies may be utilized to assist in promoting desired contact between the battery cell arrays 312, the thermal plate 350, and the thermal interface component 352. For example, a third center bar assembly 360 may include an arrangement of the lower center bar 330, a receiving nut 370, and a bolt 372. The receiving nut 370 may be threaded and secured to an inner portion of the lower center bar 330. The receiving nut 370 may be configured to receive the bolt 372 such that the bolt 372 may mesh with the receiving nut 370. FIGS. 11A and 11B show an example, in cross-section, of the third center bar assembly 360 in a first and second position. The thermal interface component 352 is shown compressed between the battery cells 314 and the thermal plate 350 in FIG. 11B. A lower portion of the bolt 372 may contact the battery tray 310 under certain conditions. The bolt 372 may exert a force against the battery tray 310 when, for example, a torque is applied to the bolt 372. The force exerted against the battery tray 310 may drive the lower center bar 330 upward to contact the thermal plate 350 and push the thermal plate 350 toward the battery cell arrays 312. The upward movement of the thermal plate 350 may compress the thermal interface component 352 between the thermal plate 350 and the battery cell arrays 312 to assist in providing uniform or substantially uniform contact between the thermal interface component 352 and the battery cell arrays 312. Various torque applications may be applied to the bolt 372 to provide a desired amount of movement of the pair of lower center bars 330 and the thermal plate 350 according to a particular traction battery packaging requirement.

Figure 12A:
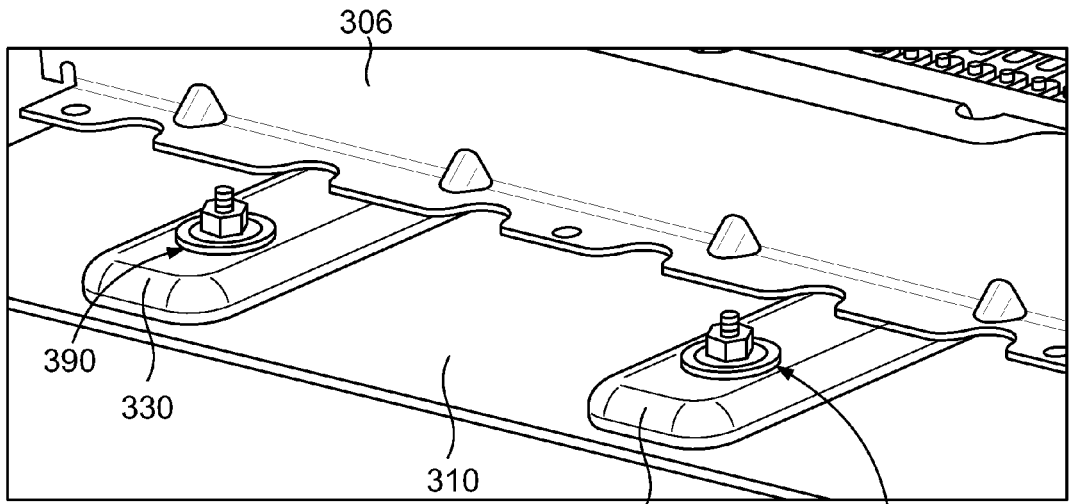
FIG. 12A is a fragmentary perspective view, of the portion of the traction battery of FIG. 8 showing another example of a center bar assembly.
Figure 12B:
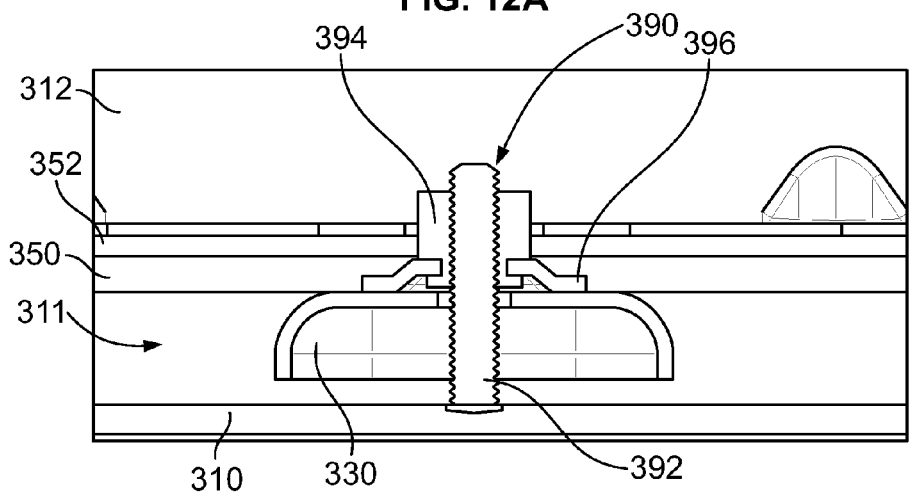
FIG. 12B is a front view, in cross-section, of the center bar assembly of FIG. 12A shown in a first position.
Figure 12C:
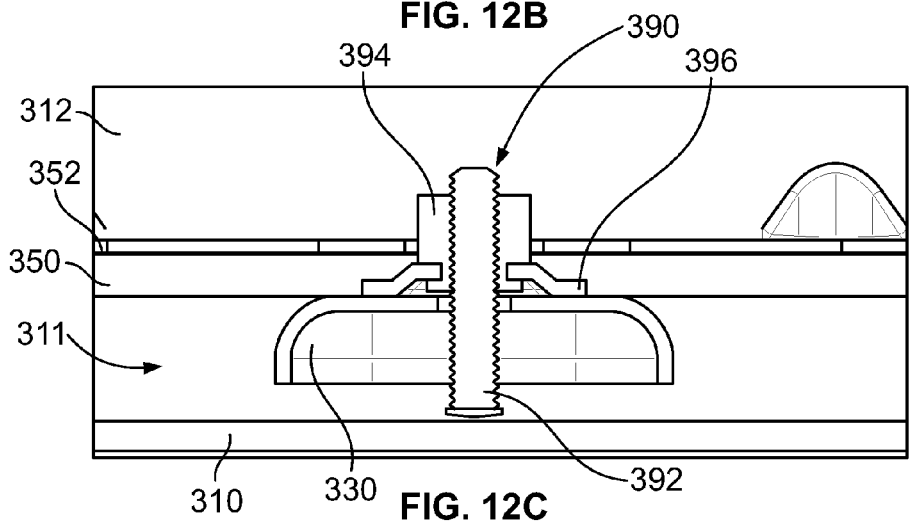
FIG. 12C is a front view, in cross-section, of the center bar assembly of FIG. 12A shown in a second position.

FIGS. 12A through 12C show another example of a center bar assembly which may be utilized to assist in promoting desired contact between the battery cell arrays 312 and the thermal interface component 352. For example, a fourth center bar assembly 390 may include the lower center bar 330, a stud 392, a wrenchable weld nut 394, and a cap 396. The stud 392 may be secured to the battery tray 310 and extend through the lower center bar 330. The wrenchable weld nut 394 may be threaded and rotatably secured to the cap 396. The wrenchable weld nut 394 may be configured to receive the stud 392 such that the stud 392 may mesh with the wrenchable weld nut 394. The cap 396 may be secured to the lower center bar 330. FIGS. 12b and 12C show an example, in cross-section, of the fourth center bar assembly 390 in a first and a second position. The thermal interface component 352 is shown compressed between the battery cells 314 and the thermal plate 350 in FIG. 12C. The wrenchable weld nut 394 may be loosened to move the lower center bar 330 vertically such that a force is exerted against thermal plate 350. The upward movement of the thermal plate 350 may compress the thermal interface component 352 between the thermal plate 350 and the battery cell arrays 312 to assist in providing uniform or substantially uniform contact between the thermal interface component and the battery cell array 312. The wrenchable weld nut 394 may be loosened or tightened to provide a desired amount of movement of the lower center bar 330 according to a particular traction battery packaging requirement.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle traction battery assembly comprising:
    a structure to support a thermal plate and battery cell array and including a center bar spanning between endplates of the structure;
    a thermal interface component disposed between the array and plate; and
    a pressure plate spanning an array upper face and disposed within a passageway defined by the bar and face; and
    a fastener assembly to selectively move the pressure plate to compress the thermal interface component.

2. The assembly of claim 1, wherein the pressure plate defines two flanges extending outside of the passageway, and wherein the flanges are shaped to define a trough to receive portions of the center bar to orient the pressure plate along a central longitudinal axis of the array.

3. The assembly of claim 1, wherein the fastener assembly further comprises:

a receiving nut secured to the center bar within the passageway; and a bolt extending through the center bar and receiving nut, and configured to contact and move the pressure plate when a torque is applied to the bolt.

4. The assembly of claim 3, wherein the battery cell array defines a central longitudinal axis along the array upper face, and wherein the receiving nut and bolt are located proximate the central longitudinal axis.

5. The assembly of claim 1, wherein the fastener assembly further comprises:

a stud extending from the pressure plate and through the center bar, and a fastener located outside of the passageway, threaded with the stud, and configured to drive movement of the pressure plate such that the pressure plate exerts a force against the array upper face.

6. The assembly of claim 5, wherein the battery cell array defines a central longitudinal axis along the array upper face, and wherein the stud and fastener are located proximate the central longitudinal axis.

7. The assembly of claim 1, wherein the pressure plate is configured for vertical movement relative to the center bar.

8. A vehicle comprising:

a support structure including a pair of endplates and sidewalls configured to retain a battery cell array defining an upper face;

a center bar assembly secured to the endplates and including a center bar extending along a length of the upper face and defining a passageway therebetween, a receiving nut secured to the center bar within the passageway, and a bolt extending through the center bar and receiving nut;

a pressure plate partially disposed within the passageway and extending along the length of the array;

a thermal plate supported by the structure and located below the array; and a thermal interface component disposed between the plate and array, wherein the bolt is arranged with the pressure plate to exert thereupon when a torque is applied to the bolt such that the thermal interface component is compressed between the array and plate.

9. The vehicle of claim 8, wherein the pressure plate defines a pair of flanges each extending outside the passageway, and wherein the flanges each define a trough to receive a lower portion of the center bar.

10. The vehicle of claim 9, wherein the battery cell array defines a central longitudinal axis along the upper face, and wherein the receiving nut and the bolt are located proximate the central longitudinal axis.

11. The vehicle of claim 9, wherein the center bar assembly further comprises a stud extending from the pressure plate and through the center bar, and a fastener threaded with the stud and configured to drive movement of the pressure plate such that the pressure plate exerts a force against the upper face.

12. The vehicle of claim 11, wherein the battery cell array defines a central longitudinal axis along the upper face, and wherein the stud and fastener are located proximate the central longitudinal axis.

13. The vehicle of claim 8, wherein the pressure plate is configured for vertical movement relative to the center bar.

14. A vehicle traction battery assembly comprising:

a support structure including a battery tray, configured to retain a battery cell array, and defining a cavity between the tray and array;

a center bar arrangement at least partially disposed within the cavity and including a center bar supporting a thermal plate defining a lower face, a receiving nut secured to the center bar, and a bolt extending through the center bar and receiving nut; and a thermal interface component disposed between the array and plate, wherein the bolt is oriented to exert a force against the plate when a torque is applied to the bolt to compress the thermal interface component between the plate and array.

15. The assembly of claim 14, wherein the center bar is configured for vertical movement relative to the battery tray.

16. The assembly of claim 14, wherein the center bar arrangement further includes a stud extending from the battery tray and through the center bar, and a fastener threaded with the stud and configured to drive movement of the center bar such that the thermal interface component is compressed between the thermal plate and battery cell array.

* * * * *